US012802995B2

(12) United States Patent
Li et al.

(10) Patent No.: US 12,802,995 B2
(45) Date of Patent: Nov. 17, 2026

(54) POSITIVE ELECTRODE SHEET, SECONDARY BATTERY COMPRISING THE SAME, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Quanguo Li, Ningde (CN); Qian Liu, Ningde (CN); Yonghuang Ye, Ningde (CN); Jianfu He, Ningde (CN); Fajun Huang, Ningde (CN); Chunpeng Yu, Ningde (CN); Dejun Xiao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 998 days.

(21) Appl. No.: 18/069,187

(22) Filed: Dec. 20, 2022

(65) Prior Publication Data

US 2023/0170484 A1 Jun. 1, 2023

Related U.S. Application Data

(63) Continuation of application No. PCT/CN2021/134819, filed on Dec. 1, 2021.

(51) Int. Cl.
*H01M 4/62* (2006.01)
*H01M 4/02* (2006.01)
(Continued)

(52) U.S. Cl.
CPC ........... *H01M 4/623* (2013.01); *H01M 4/505* (2013.01); *H01M 4/525* (2013.01); *H01M 4/625* (2013.01);
(Continued)

(58) Field of Classification Search
CPC ...... H01M 4/0404; H01M 4/13; H01M 4/139; H01M 4/1391; H01M 4/505; H01M 4/525;
(Continued)

(56) References Cited

U.S. PATENT DOCUMENTS

2017/0279114 A1* 9/2017 Komura ................ H01M 4/621
2018/0159114 A1* 6/2018 Tanihara .............. H01M 4/139
(Continued)

FOREIGN PATENT DOCUMENTS

CN 102272982 A 12/2011
CN 102856579 A 1/2013
(Continued)

OTHER PUBLICATIONS

KR20170021487A translation (Year: 2017).*
(Continued)

*Primary Examiner* — Allison Bourke
*Assistant Examiner* — Travis L. Martin
(74) *Attorney, Agent, or Firm* — ANOVA LAW GROUP, PLLC

(57) ABSTRACT

A positive electrode sheet includes a current collector, a resistance layer disposed on the current collector, and a positive electrode active material layer. The current collector includes a coating region and a non-coating region. The resistance layer includes a conductive agent and a first binder. The positive electrode active material layer includes a positive electrode active material, a conductive agent, and a second binder. A resistance of the resistance layer is greater than a resistance of the positive electrode active material layer. In a cross section of the positive electrode sheet, a projection of a part of the positive electrode active material layer on the current collector overlaps with a projection of the resistance layer on the current collector, and a projection of another part of the positive electrode active material layer on the current collector does not overlap with the projection of the resistance layer on the current collector.

18 Claims, 8 Drawing Sheets

(51) Int. Cl.
*H01M 4/505* (2010.01)
*H01M 4/525* (2010.01)
*H01M 10/0525* (2010.01)

(52) U.S. Cl.
CPC .................. *H01M 10/0525* (2013.01); *H01M 2004/021* (2013.01); *H01M 2004/028* (2013.01)

(58) Field of Classification Search
CPC ........... H01M 4/62–626; H01M 4/667; H01M 10/0525
See application file for complete search history.

(56) References Cited

U.S. PATENT DOCUMENTS

| | | | | |
|---|---|---|---|---|
| 2021/0296654 | A1 | 9/2021 | Liang et al. | |
| 2022/0173377 | A1* | 6/2022 | Kong | H01M 4/136 |
| 2023/0122728 | A1* | 4/2023 | Zhang | H01M 4/505 429/209 |

FOREIGN PATENT DOCUMENTS

| | | | | | |
|---|---|---|---|---|---|
| CN | 104620423 | A | | 5/2015 | |
| CN | 105703010 | A | | 6/2016 | |
| CN | 107004836 | A | | 8/2017 | |
| CN | 107004837 | A | | 8/2017 | |
| CN | 107210417 | A | | 9/2017 | |
| CN | 207233865 | U | | 4/2018 | |
| CN | 112825621 | A | | 5/2021 | |
| JP | 1173947 | A | | 3/1999 | |
| KR | 20170021487 | A | * | 2/2017 | H01M 2/1016 |

OTHER PUBLICATIONS

The European Patent Office (EPO) The Extended European Search Report for Application No. 21943323.2 Oct. 4, 2024 11 Pages.
The World Intellectual Property Organization (WIPO) International Search Report for PCT/CN2021/134819 Aug. 25, 2022 11 pages (with translation).
State Intellectual Property Office of China Notice of Grant of Invention Patent Right for Application No. 202180096876.6 Jun. 1, 2026 8 pages (including translation).

* cited by examiner

POSITIVE ELECTRODE SHEET, SECONDARY BATTERY COMPRISING THE SAME, BATTERY MODULE, BATTERY PACK, AND ELECTRICAL APPARATUS

CROSS-REFERENCE TO RELATED APPLICATION

This application is a continuation of International Application No. PCT/CN2021/134819, filed on Dec. 1, 2021, the entire content of which is incorporated herein by reference.

TECHNICAL FIELD

The present application relates to the technical field of secondary batteries, and in particular to a positive electrode sheet applicable to a secondary battery, a secondary battery including the positive electrode sheet, a battery module, a battery pack, and an electrical apparatus.

BACKGROUND ART

In recent years, with the vigorous promotion of new energy electric vehicles, the market share of new energy electric vehicles is also increasing. At present, the most widely used energy storage batteries for new energy electric vehicles are mainly lithium-ion secondary batteries. With the continuous development of lithium-ion secondary batteries and their extensive use, higher requirements have been put forward on their energy density, cycle performance, and safety performance.

However, at present, cycle life of a lithium-ion secondary battery generally ranges from 800 to 900 times of charge and discharge, and then capacity decays to about 80% of an initial value. At present, in order to prolong service life of the battery, more effective means include: improving surface coating of an active material, reducing surface side reaction; increasing content of a conductive material, decreasing a resistance; and the like. However, existing methods all bring high cost and technical challenges. Therefore, existing lithium ion secondary batteries still need to be improved in terms of service lives.

SUMMARY

In view of the above problems, an objective of the present application is to provide a positive electrode sheet for a secondary battery, a secondary battery including the positive electrode sheet, a battery module, a battery pack, and an electrical apparatus. By controlling release of lithium ions, it is realized that capacity fade of the battery is slowed down while ensuring power performance of the battery, thereby prolonging service life.

In order to achieve the above objective, on the one hand, the present application provides a positive electrode sheet for a secondary battery, including a current collector, a resistance layer, and a positive electrode active material layer, wherein

- the current collector includes a coating region and a non-coating region other than the coating region,
- the resistance layer includes a conductive agent and a binder, but does not include a positive electrode active material,
- the positive electrode active material layer includes a positive electrode active material, a conductive agent, and a binder,

- a resistance of the resistance layer is greater than a resistance of the positive electrode active material layer, and the resistance layer is disposed on the current collector, and
- in the cross section of the positive electrode sheet, a projection (in the present application, the projection refers to an orthographic projection perpendicular to a main surface of the current collector) of a part of the positive electrode active material layer on the current collector overlaps with a projection of the resistance layer on the current collector, and a projection of the other part of the positive electrode active material layer on the current collector does not overlap with the projection of the resistance layer on the current collector.

In some embodiments, polarization parameter P of the positive electrode sheet is in a range of 0.5 to 70.0, in some embodiments 0.5 to 36.0, and in some embodiments 0.5 to 10.0, and the polarization parameter $P=((1-S)/S)\cdot(R1/R2)$, where S is an area ratio of the resistance layer to the coating region of the current collector, R1 is a film resistance value of a part of the positive electrode sheet where the resistance layer is provided, and R2 is a film resistance value of a part of the positive electrode sheet where the resistance layer is not provided in the coating region.

In some embodiments, the area ratio S of the resistance layer to the coating region of the current collector is in a range of 0.20 to 0.80, in some embodiments in a range of 0.40 to 0.60.

In some embodiments, the projection of the positive electrode active material layer on the current collector fully covers the projection of the resistance layer on the current collector.

In some embodiments, a mass ratio of the binder to the conductive agent in the resistance layer is greater than a mass ratio of the binder to the conductive agent in the positive electrode active material layer; in some embodiments, in the resistance layer, the mass ratio of the binder to the conductive agent is in a range of 2.2 to 50.0, and in some embodiments is in a range of 4.0 to 20.0; and/or in some embodiments, in the positive electrode active material layer, the mass ratio of the binder to the conductive agent is in a range of 1.6 to 10.0, and in some embodiments is in a range of 2.0 to 3.4.

In some embodiments, in the resistance layer, mass content of the conductive agent is 2.0 to 30.0 wt % based on the total weight of the resistance layer, and mass content of the binder is 70.0 to 98.0 wt % based on the total weight of the resistance layer.

In some embodiments, a conductive agent layer is further provided on the current collector, a projection of the conductive agent layer on the current collector does not overlap with the projection of the resistance layer on the current collector, and a resistance of the conductive agent layer is less than the resistance of the positive electrode active material layer. In some embodiments, the projections of the conductive agent layer and the resistance layer on the current collector fully cover the projection of the positive electrode active material layer on the current collector. In some embodiments, R3/R1 is in a range of 0.10 to 0.95, where R1 is the film resistance value of the part of positive electrode sheet where the resistance layer is provided, and R3 is a film resistance value of the part of the positive electrode sheet where the conductive agent layer is provided.

In some embodiments, R1/R2 is in a range of 1.15 to 26.00, where R1 is the film resistance value of the part of the positive electrode sheet where the resistance layer is provided, and R2 is the film resistance value of the part of the positive electrode sheet where the resistance layer is not provided in the coating region; in some embodiments, R1 is in a range of 0.3 to 9.0Ω; and/or in some embodiments, R2 is in a range of 0.3 to 4.0Ω.

In some embodiments, the positive electrode active material includes one or more selected from lithium cobalt oxide, lithium manganate, lithium nickel cobalt manganese oxide, lithium nickel cobalt aluminium oxide, lithium iron phosphate, and lithium manganese nickel oxide; the conductive agent includes one or more selected from graphite, carbon black, acetylene black, graphene, and carbon nanotubes; and the binder includes one or more selected from polyvinylidene fluoride, polyacrylic acid, polytetrafluoroethylene, and polyimide.

In some other embodiments, a first positive electrode active material and a second positive electrode active material respectively include one or more selected from layered transition metal oxide, polyanionic compound, Prussian blue compound, sulfide, nitride, carbide, and titanate.

In some embodiments, a compacted density of the positive electrode sheet is 1.5 to 4.0 g/$cm^3$, and in some embodiments 2.3 to 3.5 g/$cm^3$.

In some embodiments, a thickness of the current collector is 8 to 14 μm, and in some embodiments 10 to 13 μm; a thickness of the positive electrode sheet is 100 to 200 μm; and/or a thickness of the resistance layer is 1 to 30 μm, and in some embodiments 10 to 13 μm.

In some embodiments, $D_v50$ of the positive electrode active material is 1 to 20 and in some embodiments 3 to 15 μm.

On the other hand, the present application further provides a secondary battery, including a positive electrode, a negative electrode, an electrolyte, and a separator, wherein the positive electrode may include the positive electrode sheet for a secondary battery of the present application as described above.

In another aspect, the present application further provides a battery module. The battery module of the present application may include the secondary battery of the present application as described above.

In another aspect, the present application provides a battery pack. The battery pack of the present application may include the battery module of the present application as described above.

In another aspect, the present application further provides an electrical apparatus. The electrical apparatus of the present application may include the secondary battery of the present application, or the battery module of the present application, or the battery pack of the present application, or a combination thereof.

In the secondary battery of the present application, by applying the positive electrode sheet provided with the resistance layer of the present application in the battery, deintercalation speed of active lithium ions in part of a region of the positive electrode sheet is slowed down, so that part of lithium is retained in this region (because during charging, compared with a conventional positive electrode active material layer, the deintercalation speed of active lithium ions in this region is slow, so that part of lithium can be retained at the end of charging). During a subsequent cycle process of the battery, with gradual aging of the battery, the active lithium retained in part of the region of the positive electrode sheet is gradually released, and battery capacity shows a trend of increasing first and then gradually fading, so that service life of the battery is prolonged.

DESCRIPTION OF REFERENCE NUMERALS

Figure 1:
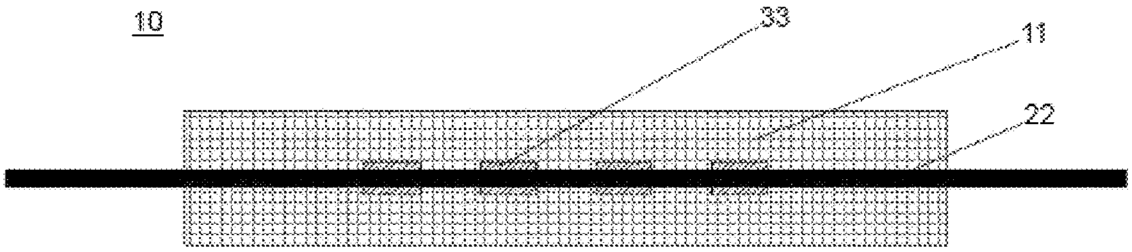
FIG. 1 is a schematic cross-sectional view of a positive electrode sheet in a thickness direction according to an embodiment of the present application.

10 positive electrode sheet
11 positive electrode active material layer
22 current collector
33 resistance layer
44 conductive agent layer
1 battery pack
2 upper box
3 lower box
4 battery module
5 secondary battery
51 case
52 electrode assembly
53 top cover assembly

DETAILED DESCRIPTION

In order to make the objectives, technical solutions and advantages of the present application clearer, the embodiments of the present application will be described in detail below with reference to the drawings. However, it should be understood by those of ordinary skills in the art that these embodiments are only used for illustrating the technical solutions of the present application, rather than limiting them.

For the sake of brevity, the present application specifically discloses some numerical ranges. However, any lower limit can be combined with any upper limit to form a range not explicitly recited; and any lower limit can be combined with another lower limit to form a range not explicitly recited, and likewise, any upper limit can be combined with any another upper limit to form a range not explicitly recited. Further, each individually disclosed point or single value itself may serve as a lower limit or upper limit in combination with any other point or single value or with other lower limits or upper limits to form an unspecified range.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and in some embodiments sequentially. For example, the method includes steps (a) and (b), meaning that the method may include steps (a) and (b) performed sequentially, or may include steps (b) and (a) performed sequentially. For example, the reference to the method may further include step (c), meaning that step (c) may be added to the method in any order, for example, the method may include steps (a), (b) and (c), or may include steps (a), (c) and (b), or may include steps (c), (a) and (b), and so on.

Unless otherwise specified, the terms "comprise", "comprising", "include" and "including" mentioned in the present application may be open-ended or closed-ended. For example, the "including" and "comprising" may indicate that it is possible to include or comprise other components not listed, and it is also possible to include or comprise only the listed components.

Unless otherwise specified, in the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "transverse", "longitudinal", "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the existing technologies, it is generally recognized that a cell internal resistance can be reduced by decreasing impedance of an electrode sheet including an active material layer and a current collector, thereby facilitating improvement of cycle performance of a lithium-ion secondary battery. Battery dynamic performance is affected by deintercalation speed of lithium ions of a positive electrode sheet. The faster the deintercalation speed of lithium ions, that is, the faster the lithium ions being deintercalated from a positive electrode active material layer to a negative electrode, the better the dynamic performance.

However, the inventor of the present application has found through research that by providing a resistance layer having a higher resistance than the positive electrode active material layer in a predetermined manner on a current collector of the positive electrode sheet for a secondary battery, cycle performance of the secondary battery can be improved, and service life of the battery can be prolonged. Specifically, a projection of the resistance layer of the present application on the current collector does not overlap with a projection of at least a part of the positive electrode active material layer on the current collector. Thus, when the battery starts to be charged, the positive electrode sheet has the same potential everywhere, and lithium ions are deintercalated from the positive electrode active material layer and move to the negative electrode. During charging, due to the resistance layer, part of lithium is retained in the positive electrode active material layer (with the projection overlapped) located above the resistance layer (that is, part of lithium is not deintercalated from the positive electrode active material and is retained), but the positive electrode active material layer (with the projection not overlapped) that is not located above the resistance layer is not affected by the above. With charging and discharging of the lithium-ion secondary battery, the lithium retained in the positive electrode active material layer above the resistance layer continuously replenishes lithium consumed by the negative electrode. During a cycle process, with gradual elimination of battery polarization and aging of the battery, battery capacity shows a trend of increasing first and then gradually fading, and finally capacity fade of the battery is slowed down as a whole, thereby prolonging service life of the battery.

Based on the above, the present application provides a positive electrode sheet for a secondary battery, which includes a current collector, a resistance layer, and a positive electrode active material layer, wherein the current collector includes a coating region and a non-coating region other than the coating region, the resistance layer includes a conductive agent and a binder, but does not include a positive electrode active material, the positive electrode active material layer includes a positive electrode active material, a conductive agent, and a binder, a resistance of the resistance layer is greater than a resistance of the positive electrode active material layer, and the resistance layer is disposed on the current collector, and in the cross section of the positive electrode sheet, (in the present application, the cross section refers to a section perpendicular to a main surface of the current collector), a projection of a part of the positive electrode active material layer on the current collector overlaps with a projection of the resistance layer on the current collector, and a projection of the other part of the positive electrode active material layer on the current collector does not overlap with the projection of the resistance layer on the current collector.

As mentioned above, in the present application, the current collector includes a coating region and optionally a non-coating region other than the coating region. In the coating region, the positive electrode active material layer and the resistance layer may be disposed on the current collector. The non-coating region other than the coating region may be located at either end or around the coating region. In the present application, the purpose of describing the non-coating region is only to illustrate that the area as a basis for an area ratio of the resistance layer is the area of the region of the current collector coated with a coating (rather than the area of the entire current collector). In other words, if a surface of the current collector is fully coated, the current collector may only include the coating region.

As described above, in the present application, in the cross section of the positive electrode sheet, the projection of a part of the positive electrode active material layer on the current collector overlaps with a projection of the resistance layer on the current collector, and the projection of the other part of the positive electrode active material layer on the current collector does not overlap with the projection of the resistance layer on the current collector. In this way, the projection of the resistance layer of the present application on the current collector does not overlap with a projection of at least a part of the positive electrode active material layer on the current collector. This structural feature can play a role of imparting a polarization capability to the positive electrode sheet, thereby slowing down capacity fade and prolonging service life of the battery. Specifically, as described above, during charging, part of lithium that is not deintercalated from the positive electrode active material due to the resistance layer may be retained in the positive electrode active material layer (with the projection overlapped) above the resistance layer, but the positive electrode active material layer (with the projection not overlapped) that is not located above the resistance layer is not affected by the above. With charging and discharging of the lithium-ion secondary battery, the lithium retained in the positive electrode active material layer above the resistance layer continuously replenishes lithium consumed by the negative electrode. During a cycle process, with gradual elimination of battery polarization and aging of the battery, battery capacity shows a trend of increasing first and then gradually fading, and finally capacity fade of the battery is slowed down as a whole, thereby prolonging service life of the battery.

In the present application, the resistance layer does not fully cover the coating region of the current collector. In other words, an area ratio S of the resistance layer to the coating region of the current collector is less than 1.

By providing the resistance layer with a higher resistance as described above, the positive electrode sheet of the present application has different film resistance values in the part where the resistance layer is provided and the part where the resistance layer is not provided. In the present application, the film resistance value of the part of the positive electrode sheet where the resistance layer is provided is denoted as R1, the film resistance value of the part of the positive electrode sheet where the resistance layer is not provided in the coating region of the current collector is denoted as R2, and R1/R2 is greater than 1.

Those skilled in the art can adjust the polarization capability of the positive electrode sheet by changing the area and resistance of the resistance layer. When the area of the resistance layer is appropriately expanded, the area ratio of the resistance layer to the coating region of the current collector is correspondingly increased, and the amount of active lithium retained in the positive electrode sheet can be appropriately increased. When the resistance of the resistance layer is appropriately increased, a resistance difference between the resistance layer and the positive electrode active material layer is correspondingly increased, so that ratio R1/R2 of the film resistance value R1 of the part of the positive electrode sheet where the resistance layer is provided to the film resistance value R2 of the part of the positive electrode sheet where the resistance layer is not provided in the coating region of the current collector is appropriately increased, and the amount of active lithium retained in the positive electrode plate can also be appropriately increased. On the other hand, when the area of the resistance layer is appropriately reduced, excessive lithium ions retained in the part of the positive electrode sheet where the resistance layer is provided on current collector can be avoided. Moreover, by appropriately reducing the area of the resistance layer, or appropriately decreasing the resistance of the resistance layer, it is possible to ensure that the battery has desirable power performance. Therefore, in the present application, during setting of the resistance layer, the area and/or resistance of the resistance layer can be appropriately adjusted according to needs. When adjusting the polarization capability of the positive electrode sheet, the area and resistance of the resistance layer can also be adjusted at the same time, so as to flexibly adjust the amount of active lithium retained in the positive electrode sheet while ensuring power performance of the battery.

As mentioned above, both the area and the resistance of the resistance layer will affect the polarization capability of the positive electrode sheet. In the present application, the polarization capability of the positive electrode sheet may be characterized by the following polarization parameter P:$P=((1-S)/S)\cdot(R1/R2)$, where S is the area ratio of the resistance layer to the coating region of the current collector, R1 is the film resistance value of the part of the positive electrode sheet where the resistance layer is provided, and R2 is the film resistance value of the part of the positive electrode sheet where the resistance layer is not provided in the coating region. In addition, in the present application, when the film resistance value R1 of the part of the positive electrode sheet where the resistance layer is provided or the film resistance value R2 of the part of the positive electrode sheet where the resistance layer is not provided in the coating region is not uniform in each region, R1 and R2 refer to average values.

In the present application, by appropriately adjusting the polarization parameter P of the positive electrode sheet, the amount of active lithium retained in the positive electrode sheet can be adjusted. As a non-limiting example, the polarization parameter P of the positive electrode sheet can be adjusted in a range of 0.5 to 70.0.

Optionally, by adjusting the area ratio of the resistance layer arranged on the current collector relative to the coating region of the current collector, and/or adjusting the ratio R1/R2 of the film resistance value R1 of the part of the positive electrode sheet where the resistance layer is provided to the film resistance value R2 of the part of the positive electrode sheet where the resistance layer is not provided in the coating region, the polarization parameter P of the positive electrode sheet can be appropriately adjusted, so that both polarization capability of the positive electrode sheet and power performance of the battery can reach the required level, thereby allowing the positive electrode sheet to retain a suitable amount of active lithium while ensuring power performance of the battery. Therefore, capacity fade of the battery can be slowed down while ensuring power performance, and cycle performance can be significantly improved. For example, the number of cycles in which battery capacity remains at 80% is significantly increased to or above 1500, while 60 s pulse discharge power of the battery remains at or above 950 W.

In some embodiments, the polarization parameter P of the positive electrode sheet can be adjusted to be not less than 0.5. In some embodiments, the polarization parameter P of the positive electrode sheet can be adjusted to be not greater than 36.0, and optionally, not greater than 10.0. In some embodiments, for example, the polarization parameter P of the positive electrode sheet can be adjusted to a range of 0.5 to 70.0, optionally, to a range of 0.5 to 36.0, and optionally, to a range of 0.5 to 10.0. Optionally, the polarization parameter P of the positive electrode sheet may be 0.5 to 60.0, 0.5 to 50.0, 0.5 to 40.0, 0.5 to 30.0, 0.5 to 25.0, 0.5 to 12.0, 0.8 to 60.0, 0.9 to 50.0, 1.2 to 40.0, 1.5 to 30.0, 2.5 to 25.0, 3.5 to 12.0, 4.0 to 32.0, 6.0 to 22.0, 7.0 to 22.0, 8.0 to 32.0, 9.0 to 18.0, 10.0 to 18.0, 11.0 to 17.0, 12.0 to 19.0, 15.0 to 19.0. or 15.0 to 26.0.

In some embodiments, the area ratio S of the resistance layer to the coating region of the current collector can be adjusted to a range of 0.20 to 0.80. In addition, based on the ratio R1/R2 of the film resistance value R1 of the part of the positive electrode sheet where the resistance layer is provided to the film resistance value R2 of the part of the positive electrode sheet where the resistance layer is not provided in the coating region, the area ratio of the resistance layer relative to the coating region of the current collector is adjusted within an appropriate range, which can also play a role in adjusting the amount of lithium retained in the positive electrode active material layer above the resistance layer, thereby allowing to adjust the amount of active lithium retained in the positive electrode sheet to adjust service life of the battery.

In some embodiments, the area ratio S of the resistance layer to the coating region of the current collector may be not less than 0.20, optionally, not less than 0.30, and optionally, not less than 0.40. In some embodiments, the area ratio S of the resistance layer to the coating region of the current collector may be not greater than 0.80, optionally, not greater than 0.70, and optionally, not greater than 0.60. In some embodiments, for example, the area ratio S of the resistance layer to the coating region of the current collector may be in a range of 0.20 to 0.60, optionally, in a range of 0.20 to 0.70, optionally, in a range of 0.30 to 0.60, optionally, in a range of 0.30 to 0.70, optionally, in a range of 0.30 to 0.80, optionally, in a range of 0.40 to 0.60, optionally, in a range of 0.40 to 0.70, and optionally, in a range of 0.40 to 0.80. In some embodiments, the area ratio S of the resistance layer to the coating region of the current collector may be in a range of 0.30 to 0.70, and optionally, in a range of 0.40 to 0.60.

Figure 2:
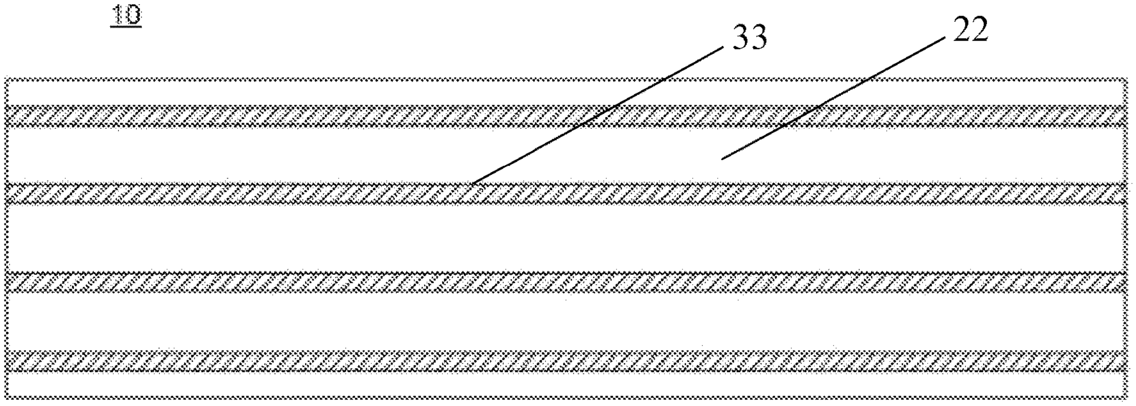
FIG. 2 is a schematic top view of the positive electrode sheet according to the embodiment of the present application shown in FIG. 1.
Figure 3:
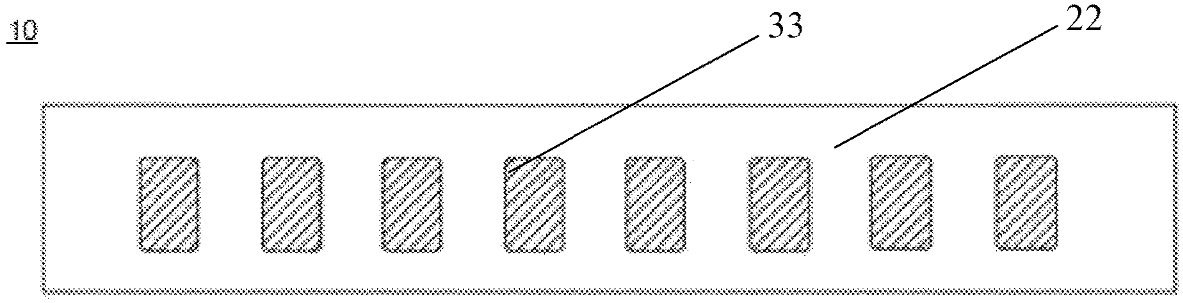
FIG. 3 is a schematic top view of a positive electrode sheet according to an embodiment of the present application.

The resistance layer may be disposed on the current collector in any manner, as long as the area ratio of the resistance layer to the coating region of the current collector satisfies requirements. As a non-limiting example, referring to FIG. 1 and FIG. 2, a resistance layer 33 may be one or more parallel coatings disposed on a current collector 22 parallel to a longitudinal direction of the positive electrode sheet. As a non-limiting example, referring to FIG. 3, the resistance layer 33 may also be one or more parallel coatings disposed on the current collector 22 perpendicular to the longitudinal direction of the positive electrode sheet.

Figure 4:
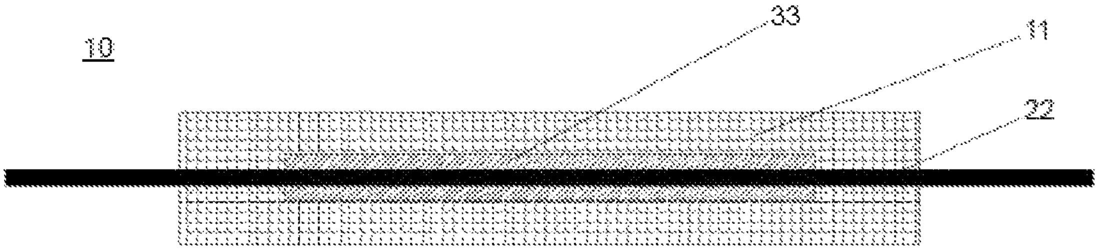
FIG. 4 is a schematic cross-sectional view of a positive electrode sheet in a thickness direction according to an embodiment of the present application.

In the present application, a projection of a part of a positive electrode active material layer 11 on the current collector 22 overlaps with a projection of the resistance layer 33 on the current collector 22, and a projection of the other part of the positive electrode active material layer on the current collector 22 does not overlap with the projection of the resistance layer 33 on the current collector 22. Optionally, as shown in FIG. 4, the projection of the positive electrode active material layer 11 on the current collector 22 fully covers the projection of the resistance layer 33 on the current collector 22.

In the resistance layer of the present application, the greater mass ratio of the binder to the conductive agent leads to a greater resistance of the resistance layer, thereby leading to a greater film resistance value of the part of the positive electrode sheet where the resistance layer is provided. Therefore, optionally, the mass ratio of the binder to the conductive agent in the resistance layer is greater than the mass ratio of the binder to the conductive agent in the positive electrode active material layer. That is, relative mass content of the binder relative to the conductive agent in the resistance layer is greater than relative mass content of the binder relative to the conductive agent in the positive electrode active material layer. By adjusting material composition of the resistance layer in the above manner, the obtained resistance value of the resistance layer may be appropriately greater than a resistance value of the active material layer, so that a desired level of resistance difference is produced between the part of the positive electrode sheet where the resistance layer is provided and the part of the positive electrode sheet where the resistance layer is not provided in the coating region.

Optionally, in the resistance layer, the mass ratio of the binder to the conductive agent is in a range of 2.2 to 50.0, and in some embodiments in a range of 4.0 to 20.0. Optionally, in the resistance layer, the mass ratio of the binder to the conductive agent may be 2.2 to 40.0, 2.2 to 30.0, 2.2 to 20.0, 2.8 to 50.0, 2.8 to 40.0, 2.8 to 30.0, 2.8 to 20.0, 3.4 to 50.0, 3.4 to 40.0, 3.4 to 30.0, 3.4 to 20.0, 4.0 to 50.0, 4.0 to 40.0, or 4.0 to 30.0.

Optionally, in the positive electrode active material layer, the mass ratio of the binder to the conductive agent is in a range of 1.6 to 10.0, and in some embodiments in a range of 2.0 to 3.4. Optionally, the positive electrode active material layer may be a conventional positive electrode active material layer commonly used in the art. Therefore, the mass content of the binder and the mass content of the conductive agent in the positive electrode active material layer may also be conventional contents commonly used in the art. As a non-limiting example, in the positive electrode active material layer, the mass ratio of the binder to the conductive agent is in a range of 1.6 to 10.0, and in some embodiments in a range of 2.0 to 3.4. Optionally, in the positive electrode active material layer, the mass ratio of the binder to the conductive agent may be 1.6 to 8.0, 1.6 to 6.0, 1.6 to 4.0, 1.8 to 10.0, 1.8 to 8.0, 1.8 to 6.0, 1.8 to 4.0, 2.0 to 10.0, 2.0 to 8.0, 2.0 to 6.0, or 2.0 to 4.0.

Optionally, in the resistance layer, the mass content of the conductive agent may be 2.0 to 30.0 wt % based on the total weight of the resistance layer. Optionally, in the resistance layer, the mass content of the conductive agent may be 2.0 to 25.0 wt %, 2.0 to 20.0 wt %, 3.0 to 30.0 wt %, 3.0 to 25.0 wt %, 3.0 to 20.0 wt %, 4.0 to 30.0 wt % %, 4.0 to 25.0 wt %, or 4.0 to 20.0 wt % based on the total weight of the resistance layer.

Optionally, in the resistance layer, the mass content of the binder may be 70.0-98.0 wt % based on the total weight of the resistance layer. Optionally, in the resistance layer, the mass content of the binder may be 70.0 to 95.0 wt %, 70.0 to 90.0 wt %, 75.0 to 98.0 wt %, 75.0 to 95.0 wt %, 75.0 to 90.0 wt %, 80.0 to 98.0 wt %, 80.0 to 95.0 wt %, or 80.0 to 90.0 wt % based on the total weight of the resistance layer.

In some embodiments, a conductive agent layer is further provided on the current collector, a projection of the conductive agent layer on the current collector does not overlap with the projection of the resistance layer on the current collector, and a resistance of the conductive agent layer is less than the resistance of the positive electrode active material layer. The arrangement of the conductive agent layer can further reduce the resistance of a part where the conductive agent layer is provided on the current collector, to improve the charge and discharge rate, thereby relieving the problem of power performance degradation due to the arrangement of the resistance layer to the battery, and finally further improving power performance of the battery.

Figure 5:
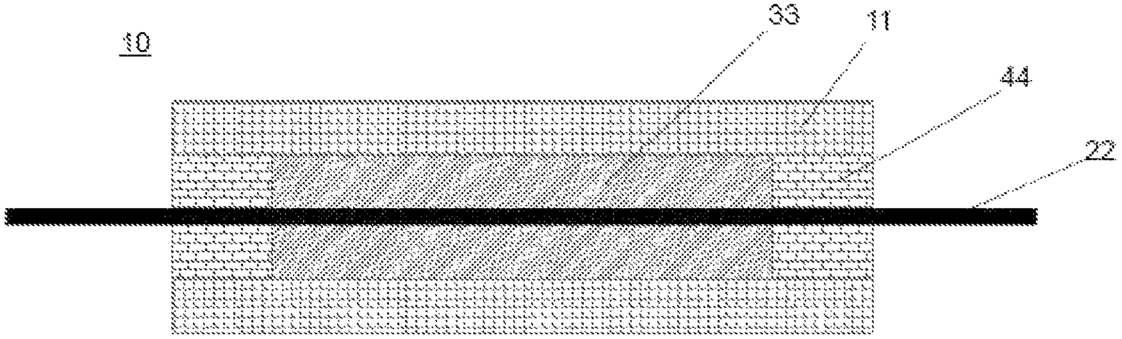
FIG. 5 is a schematic cross-sectional view of a positive electrode sheet in a thickness direction according to an embodiment of the present application.

As a non-limiting example, as shown in FIG. 5, projections of the conductive agent layer 44 and the resistance layer 33 on the current collector 22 fully cover the projection of the positive electrode active material layer 11 on the current collector 22.

In this embodiment, a film resistance value of the part of the positive electrode sheet where the conductive agent layer 44 is provided is denoted as R3. In some embodiments, ratio R3/R1 of the film resistance value R3 of the part of the positive electrode sheet where the conductive agent layer 44 is provided to the film resistance value R1 of the part of the positive electrode sheet where the resistance layer 33 is provided is in a range of 0.10 to 0.95. Optionally, R3/R1 may be 0.10 to 0.90, 0.10 to 0.85, 0.10 to 0.80, 0.20 to 0.95, 0.20 to 0.90, 0.20 to 0.85, 0.20 to 0.80, 0.30 to 0.95, 0.30 to 0.90, 0.30 to 0.85, or 0.30 to 0.80.

In some embodiments, the ratio R1/R2 of the film resistance value R1 of the part of the positive electrode sheet where the resistance layer is provided and the film resistance value R2 of the part of the positive electrode sheet where the resistance layer is not provided in the coating region may be set within a range of 1.15 to 26.00. The ratio R1/R2 is set within a specified range, so that the resistance difference between the part of the positive electrode sheet where the resistance layer is provided and the part of the positive electrode sheet where the resistance layer is not provided in the coating region is within a certain range. On the one hand, it can ensure that an ion migration rate of the part of the positive electrode sheet where the resistance layer is not provided on the current collector will not be too large, thereby avoiding undesirably causing excessive retention of lithium ions of the part of the positive electrode sheet where the resistance layer is provided on the current collector and avoiding reduction of the battery capacity; on the other hand, it can prevent the difference between the above two parts from being too small to hardly retain active lithium. Based on the area ratio of the resistance layer to the coating region of the current collector, the ratio R1/R2 is adjusted within an appropriate range, which can also play a role in adjusting the amount of active lithium retained in the positive electrode active material layer above the resistance layer, thereby flexibly adjusting service life of the battery. Optionally, R1/R2 may be 1.15 to 20.00, 1.15 to 15.00, 1.15 to 10.00, 2.00 to 26.00, 2.00 to 20.00, 2.00 to 15.00, 2.00 to 10.00, 3.00 to 26.00, 3.00 to 20.00, 3.00 to 15.00, or 3.00 to 10.00.

Optionally, the ratio R1/R2 is adjusted by mainly adjusting the film resistance value R1 of the part of the positive electrode sheet where the resistance layer is provided. As described above, the positive electrode active material layer of the positive electrode sheet may be a conventional positive electrode active material layer commonly used in the art. In this case, adjustment of R1 is mainly determined by adjusting the resistance of the resistance layer.

As a non-limiting example, R1 may be in a range of 0.3 to 9.0Ω Optionally, R1 may be 0.5 to 7.0 Ω, 1.0 to 7.0 Ω, 1.0 to 6.0 Ω, 1.0 to 5.0 Ω, 2.0 to 8.0 Ω, 2.0 to 7.0 Ω, 2.0 to 6.0 Ω, 3.0 to 8.0 Ω, 3.0-to 7.0 Ω, 3.0 to 6.0Ω, or 3.0 to 5.0Ω. As a non-limiting example, R2 may be in a range of 0.3 to 4.0Ω. Optionally, R2 may be 0.3 to 3.5 Ω, 0.3 to 2.0 Ω, 0.3 to 1.0 Ω, 0.3 to 0.5 Ω, 0.2 to 3.5 Ω, 0.2 to 2.0 Ω, 0.2 to 1.0Ω, or 0.2 to 0.5Ω.

In some embodiments, when the positive electrode sheet of the present disclosure is applied to the lithium-ion secondary battery, the positive electrode active material may include one or more selected from lithium cobalt oxide, lithium manganate, lithium nickel cobalt manganese oxide, lithium nickel cobalt aluminium oxide, lithium iron phosphate, and lithium manganese nickel oxide. As a non-limiting example, a first positive electrode active material and a second positive electrode active material may respectively include one or more selected from $LiNi_{0.55}Co_{0.05}Mn_{0.4}O_2$, $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$(NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP), and $LiMnPO_4$.

In some other embodiments, when the positive electrode sheet of the present application is applied to the sodium-ion secondary battery, the first positive electrode active material and the second positive electrode active material may respectively include one or more selected from layered transition metal oxide, polyanionic compound, Prussian blue compound, sulfide, nitride, carbide, and titanate. As a non-limiting example, the first positive electrode active material and the second positive electrode active material may respectively include one or more selected from $NaCrO_2$, $Na_2Fe_2(SO_4)_3$, molybdenum disulfide, tungsten disulfide, vanadium disulfide, disulfide Titanium, hexagonal boron nitride, carbon-doped hexagonal boron nitride, titanium carbide, tantalum carbide, molybdenum carbide, silicon carbide, $Na_2Ti_3O_7$, $Na_2Ti_6O_{13}$, $Na_4Ti_5O_{12}$, $Li_4Ti_5O_{12}$, and $NaTi_2(PO_4)_3$.

Optionally, the conductive agent may include one or more selected from graphite, carbon black, acetylene black, graphene, and carbon nanotubes. Optionally, the binder may include one or more selected from polyvinylidene fluoride, polyacrylic acid, polytetrafluoroethylene, and polyimide.

In some embodiments, a compacted density of the positive electrode sheet may be 1.5 to 4.0 g/cm$^3$, and in some embodiments 2.3 to 3.5 g/cm$^3$. The compacted density of the electrode sheet is set within a specified range, which can not only reduce a thickness of the electrode sheet and increase energy density of the battery, but also shorten an active lithium shuttle path and increase the charge and discharge rate and power. Optionally, the compacted density of the positive electrode sheet may be 1.5 to 3.3 g/cm$^3$, 1.5 to 3.5 g/cm$^3$, 1.5 to 4.0 g/cm$^3$, 2.2 to 3.3 g/cm$^3$, 2.2 to 3.5 g/cm$^3$, 3.0 to 4.0 g/cm$^3$, 3.0 to 3.3 g/cm$^3$, or 2.2 to 3.5 g/cm$^3$.

In some embodiments, a thickness of the current collector is 8 to 14 μm, and in some embodiments 10 to 13 μm. The thickness of the current collector is set within a specified range, which can not only reduce a weight of the current collector and increase the energy density, but also prevent a current flow from being hindered due to a current collector that is too thin. Optionally, the thickness of the current collector may be 8 to 13 μm, 9 to 14 μm, 9 to 13 μm, or 10 to 14 μm. Optionally, a thickness of the positive electrode sheet is 100 to 200 μm. As non-limiting examples, the thickness of the positive electrode sheet may be 100 to 180 μm, 100 to 160 μm, 120 to 200 μm, 120 to 180 μm, or 120 to 160 μm. Optionally, a thickness of the resistance layer is 1 to 30 μm, and in some embodiments 10 to 13 μm. As a non-limiting example, the thickness of the resistance layer may be 1 to 25 μm, 1 to 20 μm, 4 to 30 μm, 4 to 25 μm, 4 to 20 μm, 7 to 30 μm, 7 to 25 μm, 7 to 20 μm, 10 to 30 μm, 10 to 25 μm, or 10 to 20 μm.

In some embodiments, $D_v50$ of the positive electrode active material is 1 to 20 μm. A particle size of the positive electrode active material is set within a specified range, which can further enable the positive electrode sheet to retain an appropriate amount of active lithium. Specifically, when the particle size is large, migration of lithium ions from the inside of a particle to the outside of the particle will cause polarization. Therefore, polarization can be enhanced by using large particle size. At the beginning of charging, a part of lithium ions has a long path to be deintercalated to the outside of the particle, which will cause the part of lithium ions to be retained inside the particle after charging. The subsequently retained lithium ions are gradually released as a particle breakage and migration path is shortened during the cycle, thereby further slowing down capacity fade of the battery and further prolonging cycle life of the battery. When the particle size becomes too large, the enhancement in polarization brought about by the increase in particle size may be difficult to offset the concomitant adverse impact on battery performance due to reduction of particle dispersibility. Therefore, in some embodiments, $D_v50$ of the positive electrode active material may be 3 to 15 μm. Optionally, $D_v50$ of the positive electrode active material may be 1 to 18 μm, 1 to 15 μm, 2 to 20 μm, 2 to 18 μm, 2 to 15 μm, 3 to 20 μm, or 3 to 18 μm.

In the positive electrode sheet, the current collector has two surfaces opposite in its own thickness direction. In some embodiments, the coating region of the current collector may be disposed on either or both of the two opposite surfaces of a positive electrode current collector.

The positive electrode current collector may include a metal foil or a composite current collector. As a non-limiting example, the metal foil may include an aluminum foil. In some embodiments, the composite current collector may include a high molecular material substrate layer and a metal layer formed on at least one surface of the high molecular material substrate layer. As a non-limiting example, the composite current collector may be formed by forming a metal material (aluminium, aluminium alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In preparation of the positive electrode sheet of the present application, the resistance layer of the present application may be first formed on the current collector, and then the positive electrode active material layer may be formed on the current collector on which the resistance layer is formed.

As an example, a method of forming the resistance layer of the present application on the current collector may include the following steps: mixing the conductive agent and the binder in a certain mass ratio to add into, for example, N-methylpyrrolidone (NMP), and uniformly stirring under the action of a vacuum mixer, to obtain a slurry for the resistance layer with a specific solid content; uniformly coating a target region of the current collector with the slurry for the resistance layer by a conventional coating method (e.g., using an extrusion coating machine or a transfer coating machine), and oven-drying at a suitable temperature (e.g., 85° C.) to form the resistance layer of the present application on the current collector.

As an example, a method of forming the positive electrode active material layer of the present application on the current collector may include the following steps: mixing the positive electrode active material, the conductive agent and the binder in a certain mass ratio to add into, for example, N-methylpyrrolidone (NMP), and uniformly stirring under the action of a vacuum mixer, to obtain a slurry for the positive electrode material layer with a specific solid content (e.g., 60 wt %), uniformly coating a target region of the current collector on which the resistance layer is formed with the slurry for the positive electrode active material layer by a conventional coating method (e.g., using an extrusion coating machine or a transfer coating machine), and oven-drying at a suitable temperature (e.g., 85° C.) to form the positive electrode active material layer on the current collector on which the resistance layer is formed.

On the other hand, the present application further provides a secondary battery including a positive electrode, a negative electrode, an electrolyte, and a separator, wherein the positive electrode include the positive electrode sheet for a secondary battery of the present application as described above.

The present application further provides a battery module, including the secondary battery of the present application as described above.

The present application further provides a battery pack, including the battery module of the present application as described above.

The present application further provides an electrical apparatus, including the lithium-ion battery of the present application, or the battery module of the present application, or the battery pack of the present application, or a combination thereof.

In the secondary battery of the present application, by applying the positive electrode sheet provided with the resistance layer of the present application in the battery, deintercalation speed of active lithium ions in part of a region of the positive electrode sheet is slowed down, so that part of lithium is retained in this region (because during charging, compared with a conventional positive electrode active material layer, the deintercalation speed of active lithium ions in this region is slow, so that part of lithium can be retained at the end of charging). During a subsequent cycle process of the battery, with gradual aging of the battery, the lithium ions retained in the region of the positive electrode sheet are gradually released, and battery capacity shows a trend of increasing first and then gradually fading, so that capacity fade of the battery is slowed down and service life of the battery is prolonged.

The secondary battery, battery module, battery pack and apparatus of the present application will be described hereafter with appropriate reference to the drawings.

In an embodiment of the present application, a secondary battery is provided.

Generally, the secondary battery includes a positive electrode sheet, a negative electrode sheet, an electrolyte, and a separator. During charging and discharging of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Negative Electrode Sheet]

The negative electrode sheet includes a negative electrode current collector and a negative electrode active material layer arranged on at least one surface of the negative electrode current collector, and the negative electrode active material layer includes a negative electrode active material.

In the secondary battery of the present application, a negative-electrode active material commonly used for preparing a negative electrode of a secondary battery in the art can be used as the negative electrode active material. The negative electrode active material may include artificial graphite, natural graphite, soft carbon, hard carbon, a silicon-based material, a tin-based material, lithium titanate, or the like. The silicon-based material may be selected from one or more of elemental silicon, a silicon oxide compound (e.g., silicon monoxide), a silicon-carbon composite, a silicon-nitrogen composite, and silicon alloy. The tin-based material may be selected from one or more of elemental tin, a tin-oxygen compound, and tin alloy.

The negative electrode current collector has two surfaces opposite in its own thickness direction. As an example, the negative electrode active material layer may be disposed on either or both of the two opposite surfaces of the negative electrode current collector.

In the secondary battery of the present application, the negative electrode current collector may include a metal foil or a composite current collector. As a non-limiting example, the metal foil may include a copper foil. In some embodiments, the composite current collector may include a high molecular material substrate layer and a metal layer formed on at least one surface of the high molecular material substrate layer. As a non-limiting example, the composite current collector may be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In the secondary battery of the present application, the negative electrode active material layer generally includes a negative electrode active material, an optional binder, an optional conductive agent, and other optional additives, and is generally formed by coating and drying a slurry for the negative electrode active material layer. The slurry for the negative electrode active material layer is generally formed by dispersing the negative electrode active material as well as the optional conductive agent and the binder, and the like in a solvent and uniformly stirring. The solvent may be N-methyl pyrrolidone (NMP) or deionized water.

As an example, the conductive agent may be selected from one or more of superconducting carbon, acetylene black, carbon black, Ketjen black, carbon dot, carbon nanotube, graphene, and carbon nanofiber.

As an example, the binder may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Other optional additives are, for example, a thickener (such as sodium carboxymethylcellulose (CMC-Na)).

In some embodiments, the positive electrode sheet, the negative electrode sheet, and the separator can be made into an electrode assembly by a winding process or a lamination process.

[Electrolyte]

The examples of the present application have no specific limitation on the type of the electrolyte, which can be selected according to requirements. For example, the electrolyte may be solid or liquid.

In some embodiments, the electrolyte is liquid and typically includes an electrolyte salt and a solvent.

As an example, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP) and lithium tetrafluoro(oxalato)phosphate (LiTFOP).

As an example, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS) and ethylsulfonylethane (ESE).

In some embodiments, an additive is optionally included in the electrolyte. For example, the electrolyte may include a negative-electrode film-forming additive, a positive-electrode film-forming additive, an additive for improving the overcharge performance of the battery, an additive for improving the high temperature performance of the battery, an additive for improving the low temperature performance of the battery, and the like.

[Separator]

The separator separates the positive electrode sheet from the negative electrode sheet, preventing a short circuit in the battery, and enabling active ions to move between the positive and negative electrodes through the separator. In the secondary battery of the present application, the type of the separator is not particularly limited in the present application, and any well-known separator with a porous structure having good chemical stability and mechanical stability may be selected.

In some embodiments, the separator may be made of one or more materials selected from a thin glass fiber film, a thin non-woven cloth film, a thin polyethylene (PE) film, a thin polypropylene (PP) film, a thin polyvinylidene fluoride film, and a multilayer composite thin film including one or more than two of the above. The separator may be a single-layer film or a multi-layer composite film, which is not particularly limited. When the separator is a multi-layer composite film, the material of each layer may be the same or different, which is not particularly limited.

In some embodiments, the positive electrode sheet, the negative electrode sheet, and the separator can be made into an electrode assembly by a winding process or a lamination process.

In some embodiments, the secondary battery may include an outer package. The outer package can be configured to encapsulate the above-mentioned electrode assembly and electrolyte solution.

In some embodiments, the outer package of the secondary battery may be a hard case, such as a hard plastic case, an aluminium case, and a steel case. The outer package of the secondary battery can also be a soft pack, such as a bag-type soft pack. The soft package may be made of plastics, for example, polypropylene (PP), polybutylene terephthalate (PBT), and polybutylene succinate (PBS).

Figure 6:
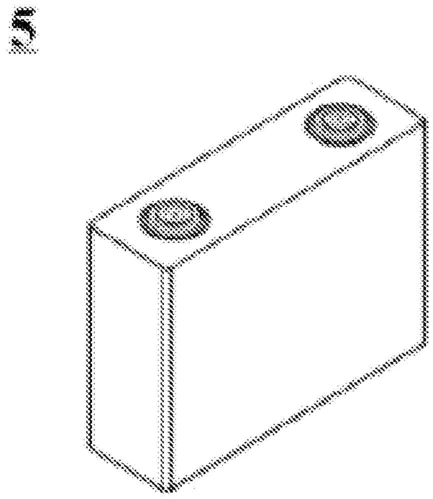
FIG. 6 is a schematic diagram of a secondary battery according to an embodiment of the present application.

The shape of the secondary battery is not particularly limited in the present application, and it may be cylindrical, square, or any other shape. For example, FIG. 6 is an example of a secondary battery 5 having a square structure.

Figure 7:
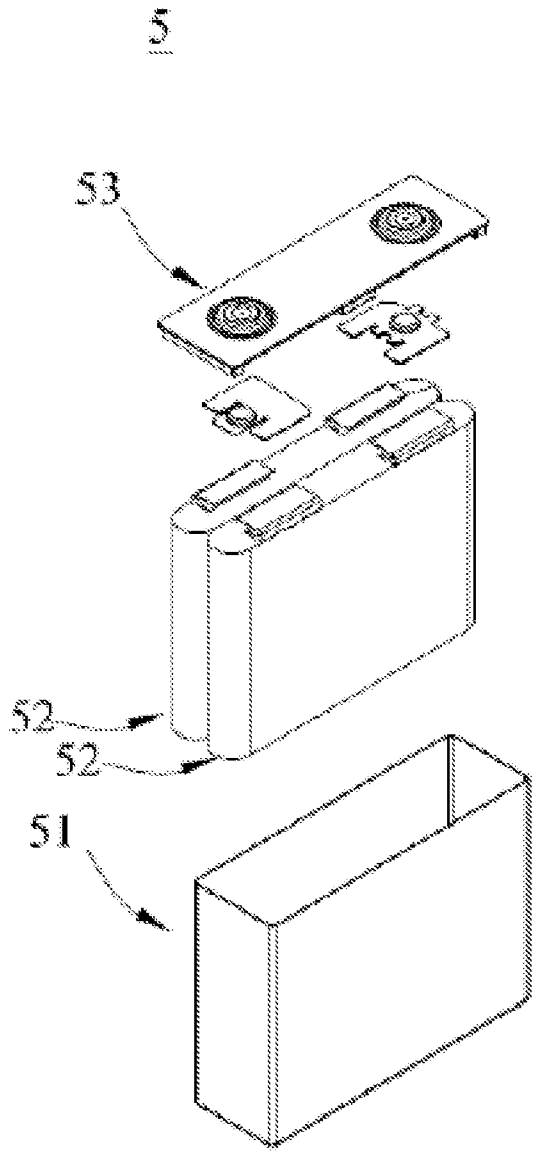
FIG. 7 is an exploded diagram of the secondary battery according to the embodiment of the present application as shown in FIG. 6.

In some embodiments, referring to FIG. 7, the outer package can include a case 51 and a cover plate 53. Here, the case 51 can include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet, and the separator can be formed into an electrode assembly 52 by a winding process or a lamination process. The electrode assembly 52 is encapsulated in the accommodating cavity. The electrolyte solution impregnates the electrode assembly 52. The number of electrode assemblies 52 contained in the secondary battery 5 may be one or more, which can be selected by those skilled in the art according to specific actual requirements.

In some embodiments, the secondary batteries can be assembled into a battery module, and the number of secondary batteries included in the battery module can be one or more, and the specific number can be selected by those skilled in the art according to the application and capacity of the battery module.

Figure 8:
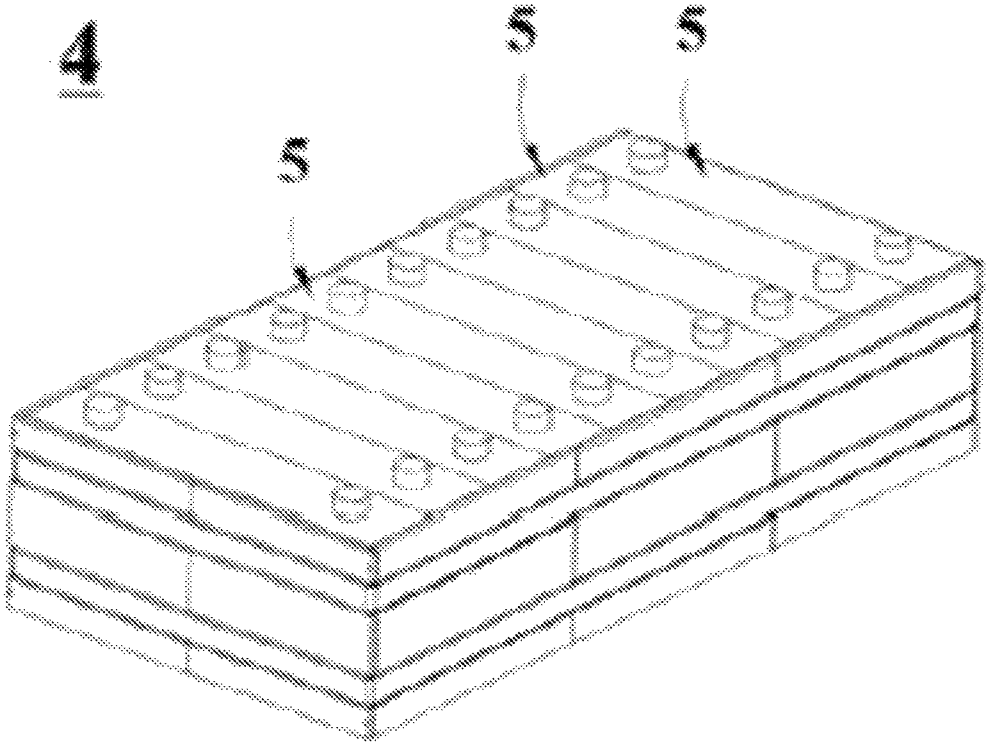
FIG. 8 is a schematic diagram of a battery module according to an embodiment of the present application.

FIG. 8 is an example of a battery module 4. Referring to FIG. 8, in the battery module 4, a plurality of secondary batteries 5 can be sequentially arranged along the length direction of the battery module 4. In another aspect, any other arrangement of the plurality of secondary batteries 5 is also possible. The plurality of secondary batteries 5 may further be fixed by fasteners.

Optionally, the battery module 4 can further include a case having an accommodating space, in which the plurality of secondary batteries 5 are accommodated.

In some embodiments, the above-mentioned battery modules can further be assembled into a battery pack. The number of battery module contained in the battery pack can be selected by those skilled in the art according to the application of the battery pack.

Figure 9:
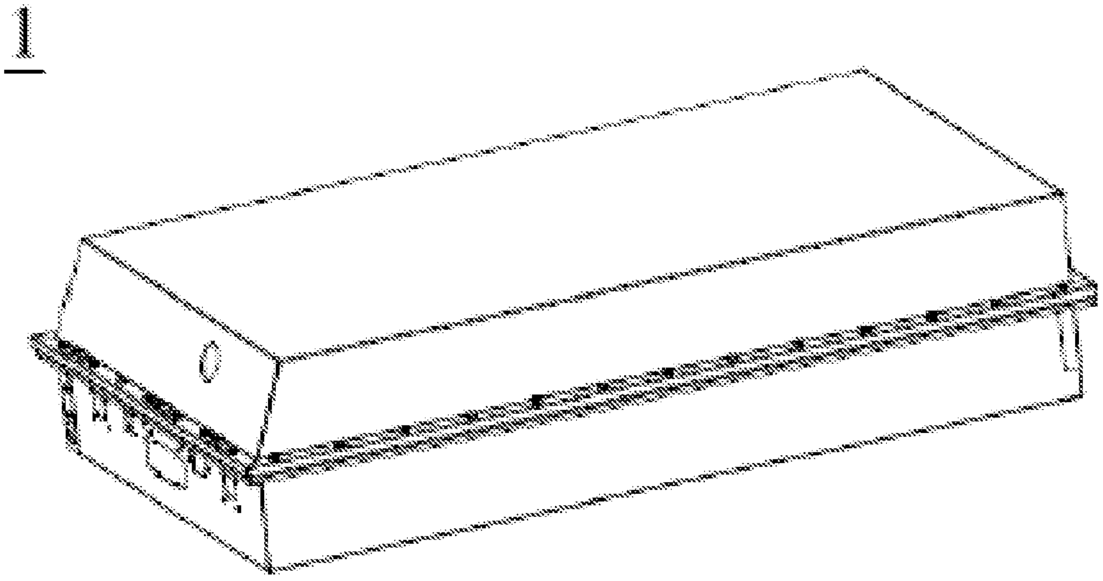
FIG. 9 is a schematic diagram of a battery pack according to an embodiment of the present application.
Figure 10:
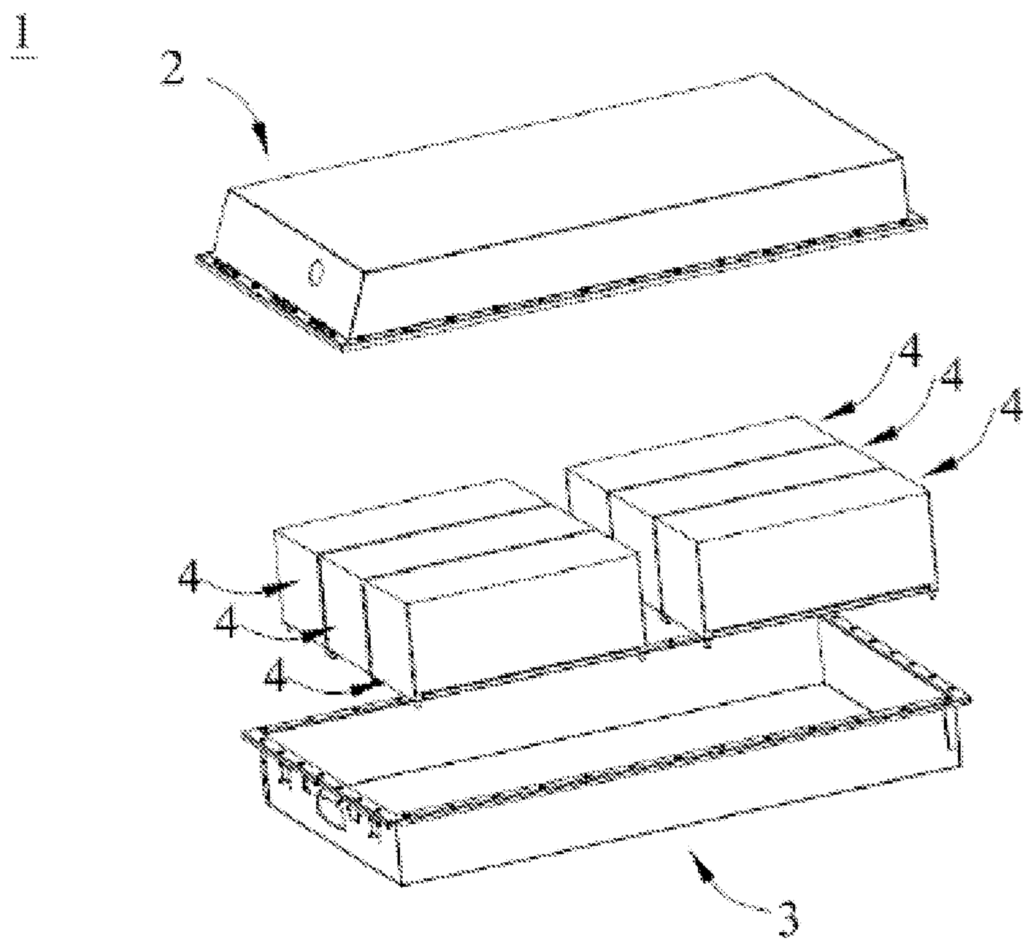
FIG. 10 is an exploded diagram of the battery pack according to the embodiment of the present application shown in FIG. 9.

FIGS. 9 and 10 are an example of a battery pack 1. Referring to FIG. 9 and FIG. 10, the battery pack 1 may include a battery box and a plurality of battery modules 4 arranged in the battery box. The battery box includes an upper box 2 and a lower box 3, where the upper box 2 can cover the lower box 3 and forms an enclosed space for accommodating the battery module 4. The plurality of battery modules 4 may be arranged in the battery box in any manner.

In addition, the present application further provides an electrical apparatus, and the electrical apparatus includes one or more of the secondary battery, the battery module, or the battery pack provided by the present application. The secondary battery, battery module, or battery pack can be used as a power source for the electrical apparatus, and can also be used as an energy storage unit for the electrical apparatus. The electrical apparatus can be, but is not limited to, a mobile device (such as a mobile phone and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc.

For the electrical apparatus, the secondary battery, battery module, or battery pack can be selected according to its use requirements.

Figure 11:
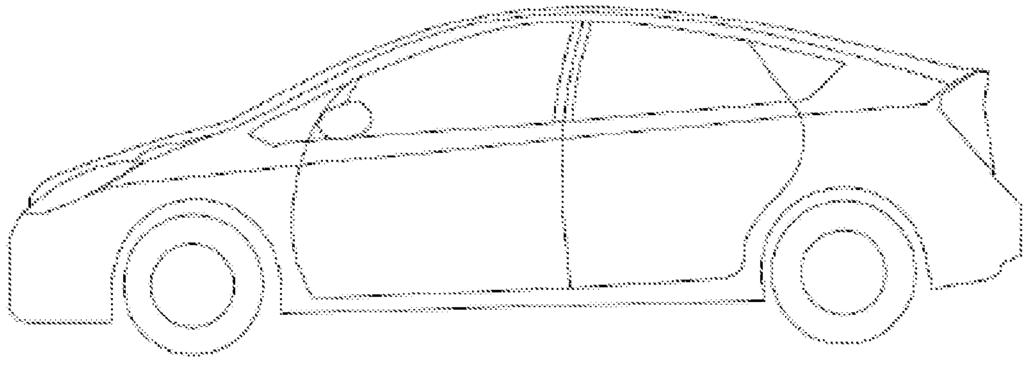
FIG. 11 is a schematic diagram of an electrical apparatus according to an embodiment of the present application in which the secondary battery is used as a power source.

FIG. 11 is an example of an electrical apparatus. The apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the electrical apparatus may be a mobile phone, a tablet, a laptop, or the like. The device is generally required to be light and thin, and can use a secondary battery as a power source.

The above summary of the disclosure of the present application is not intended to describe each disclosed embodiment or every implementation in the present application. The following description illustrates exemplary embodiments in more detail. In various places throughout the present application, guidance is provided through a series of examples, and these examples can be used in various combinations. In various examples, the enumeration is merely a representative group, and should not be construed as exhaustive.

EXAMPLES

In the following examples, unless specific conditions are indicated, it means that the described steps are carried out in accordance with conventional conditions or conditions suggested by the manufacturer. Where manufacturers are not specified, the reagents or instruments used are conventional products and are commercially available. A general method for preparing a battery (hereinafter referred to as the general method) is described below.

Preparation of Positive Electrode Sheet (1) Preparation of Slurry for Resistance Layer A conductive agent Super P and a binder polyvinylidene fluoride (PVDF) were mixed in a certain mass ratio. The obtained mixture was added to a solvent N-methylpyrrolidone (NMP), and stirred uniformly under the action of a lithium-ion battery slurry mixer (Shanghai Baomian Electromechanical Equipment Co., Ltd., model BMXJS-2000L) to obtain a slurry for the resistance layer.

(2) Preparation of Slurry for Positive Electrode Active Material Layer

A positive electrode active material $LiNi_{0.55}Co_{0.05}Mn_{0.4}O_2$, the conductive agent Super P, and a binder polyvinylidene fluoride (PVDF) were mixed at a mass ratio of 96:2.5:1.5, added to the solvent N-methylpyrrolidone (NMP), and stirred under the action of a vacuum mixer to obtain a slurry for the positive electrode active material layer. Solid content in the slurry was 60 wt %.

(3) Preparation of Positive Electrode Sheet

The slurry for the resistance layer prepared as described above was uniformly coated on a target region of the current collector by an extrusion coating machine. Specifically, by a lithium battery slot extrusion coating machine (Guangdong Hongbao Technology Co., Ltd., HB-TBY750), the slurry for the positive electrode active material layer prepared as described above was uniformly coated on an aluminum foil with a thickness of 8-14 μm at a coating speed of 36 m/min, with a coating weight of 0.9 mg/cm', where a length of a slurry nozzle of an extrusion nozzle of the extrusion coating machine was controlled by controlling a coating spacer having an opening with a specific width, so that a width-controlled undercoat layer arranged along a longitudinal length of the aluminum foil could be obtained. Optionally, by intermittently controlling a pressure switch for extrusion of the nozzle, an undercoat layer with a controlled width arranged in a direction perpendicular to the longitudinal length of the aluminum foil could be obtained. The obtained positive electrode current collector aluminum foil with the undercoat layer was oven-dried at 85° C., so that the resistance layer with a thickness of 1 to 30 μm was formed on the positive electrode current collector aluminum foil.

Next, the slurry for the positive electrode active material layer prepared as described above was uniformly coated on a target region of the positive electrode current collector aluminum foil on which the resistance layer was formed. The slurry for the positive electrode active material layer could be coated by the same method as a coating method of the slurry for the resistance layer as described above.

Optionally, a transfer coating machine could also be used for coating. Specifically, by the transfer coating machine (Yakang Precision Machinery Co., Ltd., DT600/750), the slurry for the positive electrode active material layer was uniformly coated on a target region of the collector on which the resistance layer of the present application was formed through a conventional process in the art, and then was oven-dried at 85° C., so that a positive electrode active material layer was formed on the current collector aluminum foil on which the resistance layer was formed.

Then, cold pressing, trimming, cutting, and slitting were performed on the obtained laminate through conventional processes to obtain a positive electrode sheet with a thickness of 100 to 200 μm.

Measurement of Dv50 of Positive Electrode Active Material

In the present application, a value of Dv50 of the positive electrode active material refers to a median particle size of the positive electrode active material. Specifically, a specific value of Dv50 indicates that diameter of particles accounting for 50% of the total volume is greater than the value, and the diameter of other particles accounting for 50% of the total volume is less than the value.

The value of Dv50 of the positive electrode active material can be measured with reference to a method specified in GB/T19077-2016. More specifically, the value of Dv50 can be measured by the following method.

Sample pretreatment: Take a clean beaker, add an appropriate amount of sample to be tested, add a surfactant sodium lauryl sulfate dropwise, add deionized water as a dispersant, and perform an ultrasonic treatment (120 W/5 min) to ensure that the sample is fully dispersed in the dispersant.

Test: Use an LS-909 laser particle size analyzer (Omega) to measure Dv50. After being poured into a sample injection tower, the sample was circulated to a test optical path system along with a solution, scattered light emitted by particles under irradiation of a laser beam was received, and an energy distribution thereof was measured to obtain particle size distribution characteristics of the particles (shading degree: 8-12%), and finally the value of Dv50 of the material was obtained.

Measurement of Film Resistance Value of Positive Electrode Sheet

A film resistance value of a part of the positive electrode sheet where the resistance layer is provided and a film resistance value of a part of the positive electrode sheet where the resistance layer is not provided in the coating region were both measured through a conventional electrode sheet resistance meter (Yuanneng Technology, model IEST BER1000). Specifically, a square test sample with a size of 10 cm×10 cm was cut from a to-be-measured part of the positive electrode sheet. At the to-be-measured part, the upper and lower sides of the test sample were clamped between two conductive terminals of the resistance meter, and a certain pressure was applied for fixing, so that resistance R of the test sample was measured. The diameter of the conductive terminals of the resistance meter was 14 mm, a pressure applied during the measurement was 5 MPa to 27 MPa, and the sampling time ranged from 5 s to 17 s. R is a resistance value of the sample read by the resistance meter. The film resistance value measured in the part where the resistance layer is provided was denoted as R1. The film resistance value measured in the part where the resistance layer is not provided in the coating region was denoted as R2.

Preparation of Battery (1) Preparation of Negative Electrode Sheet

A negative electrode active material artificial graphite, a conductive agent Super P, a thickener sodium carboxymethyl cellulose (CMC), and a binder styrene butadiene rubber emulsion (SBR) were mixed at a mass ratio of 97:0.7:1.8:0.5, then added into a solvent deionized water, and uniformly stirred under the action of a vacuum mixer to obtain a negative electrode slurry. Solid content in the negative electrode slurry was 56 wt %.

Through conventional processes, the negative electrode slurry was uniformly coated on a negative electrode current collector copper foil by an extrusion coating machine or a transfer coating machine, oven-dried at 85° C., and then subjected to cold pressing, trimming, cutting, slitting to obtain a negative electrode sheet.

(2) Preparation of Electrolyte Solution

In an argon atmosphere glove box with moisture content <10 ppm, a fully dried lithium salt ($LiPF_6$) was dissolved in a mixed solvent of ethylene carbonate (EC), ethyl methyl carbonate (EMC), and diethyl carbonate (DEC) in a volume ratio of 20:20:60, then vinylene carbonate (VC) was added as an additive, and mixed uniformly to obtain an electrolyte solution. Concentration of the lithium salt was 1 mol/L.

(3) Preparation of Separator

A polyethylene film (PE) with a thickness of 7 μm was used as a base film of the separator, and alumina, sodium carboxymethyl cellulose (CMC) and acrylate in a weight ratio of 93%:3%:4% were added into deionized water, and evenly stirred under the action of a vacuum mixer to obtain a slurry. Solid content in the slurry was 55 wt %. The obtained slurry was uniformly sprayed on both sides of the base film with a thickness of 2 μm on one side to obtain a separator.

(4) Assembly of Lithium-Ion Battery

The positive electrode sheet, the separator, and the negative electrode sheet were stacked in sequence, so that the separator was positioned between the positive electrode sheet and the negative electrode sheet to serve for isolation. Then, the obtained laminate was wound into a square bare battery cell, tabs were welded thereto, and after the bare battery cell was mounted into a square aluminum case, a top cover was welded by laser. Then, after dewatering by baking in vacuum at 80° C., the electrolyte solution was injected and sealed. Then, through processes such as standing at 45° C., forming (charging to 3.3 V at a constant current of 0.02 C, and then charging to 3.6 V at a constant current of 0.1 C), shaping, and capacity testing, a finished hard-case lithium-ion battery was obtained with a thickness of 28 mm, a width of 97.5 mm, and a length of 148 mm.

Measurement of Battery Performance (1) Measurement of the Number of Cycles

Cycle performance of the battery including the positive electrode sheet of the present application was evaluated under the condition of 0.5 C/0.5 C at a temperature of 25° C. Specifically, a battery cell was placed in a Nebula battery charge and discharge test system (model BAT-NEEFLCT-05300-V012), was charged to a charge cut-off voltage of 4.4 V at a constant current rate of 0.5 C, subjected to standing for 5 minutes, discharged to a discharge cut-off voltage of 2.5 V at a constant current rate of 0.5 C, and then subjected to standing again for 5 minutes after discharge capacity was record, and so on. The number of cycles in which the discharge capacity remains at or above 80% of the initial capacity was recorded.

(2) Measurement of 60 s Pulse Discharge Power

By measuring the 60 s pulse discharge power of the battery, power performance of the battery can be determined. Specifically, a battery cell was placed in a Nebula battery charge and discharge test system at 25° C., charged to a charge cut-off voltage of 4.4 V at a constant current rate of 0.5 C, and discharged at a specific power after standing for 5 minutes, and discharge was stopped when it was ensured that a voltage of the battery just reached 2.5 V at 60 s, and the power at this point was the 60 s pulse discharge power.

Examples 1 to 6 and Comparative Example

The positive electrode sheets and the batteries were prepared according to the general method described above. In Examples 1 to 6, the thickness of the aluminum foil as a current collector was 12 μm. The thickness of the resistance layer disposed on the current collector was 10 μm. Dv50 of the positive electrode active material in the positive electrode active material layer was 4 μm. The thickness of the positive electrode sheet was 120 μm and the compacted density was 3.4 g/cm$^3$.

In addition, the projection of a part of the positive electrode active material layer on the current collector overlaps with a projection of the resistance layer on the current collector, and the projection of the other part of the positive electrode active material layer on the current collector does not overlap with the projection of the resistance layer on the current collector, as shown in FIG. 4.

The composition of the resistance layer in the positive electrode sheet, the area ratio S of the resistance layer to the coating region of the current collector, the film resistance value R1 of the part where the resistance layer is provided, the film resistance value R2 of the part where the resistance layer is not provided, the corresponding value of R1/R2, the value of the polarization parameter P, the number of cycles, and the 60 s pulse discharge power of the battery measured by the performance test methods described above are shown in Table 1 below.

In the Comparative Example, the resistance layer of the present disclosure is not provided on the current collector. therefore, the positive electrode sheet only includes the current collector and the positive electrode active material layer. Performance test results of the Comparative Example are also shown in Table 1 below.

resistance layer is not provided, by arranging the resistance layer on the current collector, the projection of the part of the positive electrode active material layer on the current collector overlaps with the projection of the resistance layer on the current collector, and the projection of the other part of the positive electrode active material layer on the current collector does not overlap with the projection of the resistance layer on the current collector, cycle performance of the secondary batteries in Examples 1 to 6 was significantly improved, the number of cycles in which the discharge capacity remains at or above 80% of the initial capacity was significantly increased from 835 to 1500 or above, which greatly prolongs service life of the battery while ensuring that the battery maintains good power performance. The 60 s pulse discharge power of the battery remains at or above 1050 W.

In Examples 1 to 6, by applying the binder with a higher mass content, a higher resistance value can be achieved in the resistance layer, so that the film resistance value (R1) of the part of the positive electrode sheet where the resistance layer is provided is greater than the film resistance value (R2=0.35Ω) of the part where the resistance layer is not provided, thereby producing appropriate lithium ion polarization in the positive electrode sheet. Therefore, in the part of the positive electrode sheet where the resistance layer is provided, the deintercalation speed of active lithium ions is slowed down, so that part of lithium is retained in this part. During a subsequent cycle process of the battery, with gradual aging of the battery, the lithium ions retained in the region are gradually released, and battery capacity shows a trend of increasing first and then gradually fading, so that capacity fade of the battery is slowed down and service life of the battery is prolonged.

In addition, by adjusting the composition of the resistance layer, specifically by adjusting the mass content of the binder in the resistance layer to adjust the resistance value of the resistance layer, the amount of lithium retained in the positive electrode active material layer above the resistance layer can be adjusted, so that the amount of active lithium retained in the positive electrode sheet is adjusted, and service life of the battery can be adjusted according to needs.

In addition, compared with Example 6, in Examples 1 to 5, by adjusting the composition of the resistance layer and adjusting the polarization parameter P of the positive electrode sheet to be within a range of 0.5 to 70.0, the additional

TABLE 1

| | | Example 1 | Example 2 | Example 3 | Example 4 | Example 5 | Example 6 | Comparative Example |
|---|---|---|---|---|---|---|---|---|
| Resistance layer Composition | Binder Mass content | 98% | 90% | 80% | 70% | 50% | 100% | Without Resistance layer |
| | Conductive agent Mass content | 2% | 10% | 20% | 30% | 50% | — | |
| R1 (Ω) | | 5.81 | 3.11 | 2.12 | 1.81 | 1.17 | 8.81 | — |
| R2 (Ω) | | 0.35 | 0.35 | 0.35 | 0.35 | 0.35 | 0.35 | 0.35 |
| R1/R2 | | 16.6 | 8.89 | 6.06 | 5.17 | 3.34 | 25.17 | — |
| S | | 0.20 | 0.20 | 0.20 | 0.20 | 0.20 | 0.20 | — |
| P | | 66.4 | 35.5 | 24.2 | 20.7 | 13.4 | 100.7 | — |
| Number of cycles (times) | | 1935 | 2340 | 2580 | 2421 | 1900 | 1535 | 835 |
| 60 s pulse discharge power (W) | | 1104.5 | 1335.6 | 1472.6 | 1481.9 | 1584.5 | 1069.0 | 1620.8 |

From the results shown in Table 1, it can be seen that, compared with the Comparative Example in which the technical effect of fully maintaining battery power performance while further prolonging battery life can be achieved.

Moreover, the number of cycles in which the discharge capacity remains at or above 80% of the initial capacity was further increased to or above 1900, and the 60 s pulse discharge power of the battery remains at or above 1100 W.

Examples 7 to 21

The positive electrode sheets and the batteries were prepared according to the general method described above. In Examples 7 to 21, based on the total weight of the resistance layer, the mass content of the conductive agent was 15%, and the mass content of the binder was 85%. The thickness of the aluminum foil as the current collector was 12 μm. The thickness of the resistance layer disposed on the current collector was 10 μm. Dv50 of the positive electrode active material in the positive electrode active material layer was 4 μm. The thickness of the positive electrode sheet was 120 μm and the compacted density was 3.4 $g/cm^3$.

In the positive electrode sheet, the film resistance value R1 of the part where the resistance layer is provided and the film resistance value R2 of the part where the resistance layer is not provided were 1.98Ω and 0.35Ω, respectively. Correspondingly, R1/R2=5.66.

In addition, the projection of a part of the positive electrode active material layer on the current collector overlaps with the projection of the resistance layer on the current collector, and the projection of the other part of the positive electrode active material layer on the current collector does not overlap with the projection of the resistance layer on the current collector, as shown in FIG. 4.

The area ratio S of the resistance layer to the coating region of the current collector, the corresponding polarization parameter P value, and the number of cycles, and the 60 s pulse discharge power of the battery measured by the performance test methods described above are all shown in Table 2 below.

TABLE 2

| | S | P | Number of cycles | 60 s pulse discharge power (W) |
|---|---|---|---|---|
| Example 7 | 0.20 | 8.8 | 1851 | 1056.5 |
| Example 8 | 0.25 | 6.6 | 1973 | 1126.1 |
| Example 9 | 0.30 | 5.1 | 2115 | 1207.2 |
| Example 10 | 0.35 | 4.1 | 2387 | 1362.4 |
| Example 11 | 0.40 | 3.3 | 2500 | 1426.9 |
| Example 12 | 0.45 | 2.7 | 2639 | 1506.3 |
| Example 13 | 0.50 | 2.2 | 2552 | 1456.6 |
| Example 14 | 0.55 | 1.8 | 2364 | 1349.3 |
| Example 15 | 0.60 | 1.5 | 2226 | 1270.6 |
| Example 16 | 0.65 | 1.2 | 2189 | 1249.4 |
| Example 17 | 0.70 | 0.9 | 2109 | 1203.8 |
| Example 18 | 0.75 | 0.7 | 2078 | 1186.1 |
| Example 19 | 0.80 | 0.6 | 2050 | 1170.1 |
| Example 20 | 0.05 | 41.8 | 1569 | 1224.0 |
| Example 21 | 0.90 | 0.2 | 1722 | 982.9 |

Figure 12:
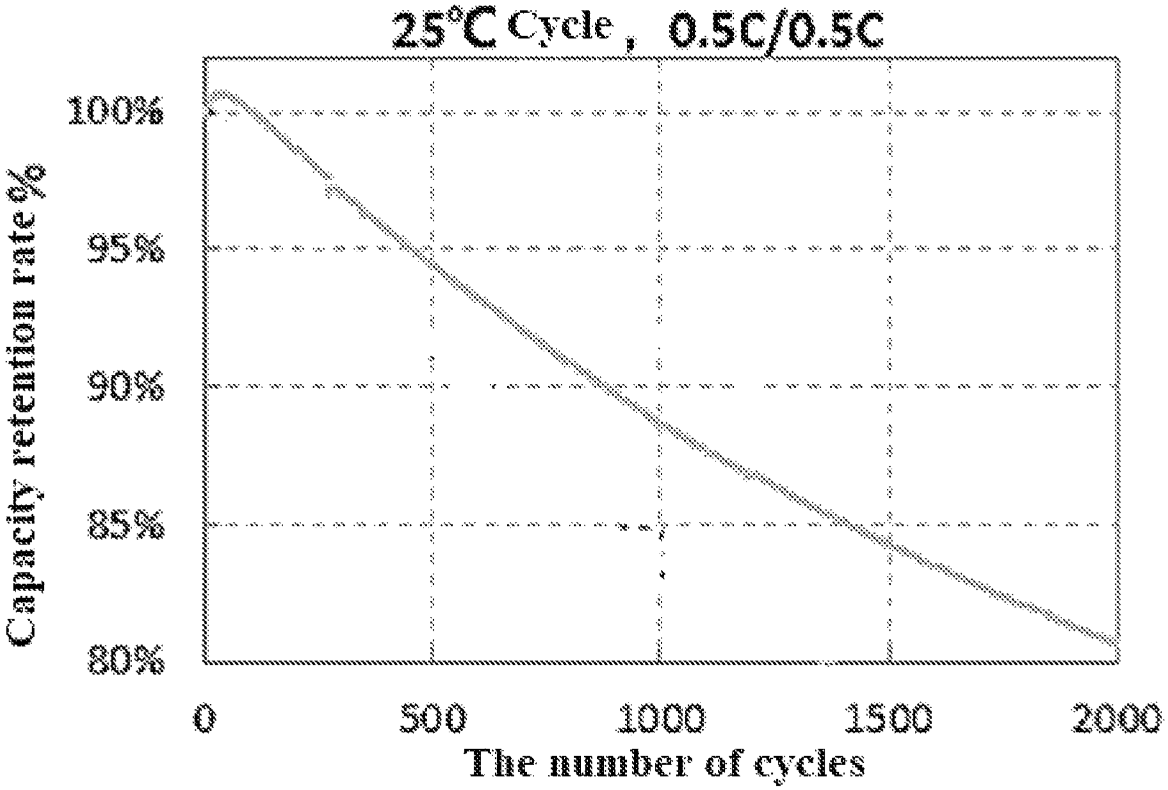
FIG. 12 is a curve graph of cycle performance of a secondary battery obtained in Example 19.

As an example, a cyclic curve of the battery in Example 19 is shown in FIG. 12. It can be clearly seen from FIG. 12 that with the gradual aging and elimination of polarization of the battery during a cycle process, the battery capacity shows a trend of increasing first and then gradually fading, so that capacity fade of the battery is slowed down and cycle life of the battery is prolonged, and moreover, the number of cycles in which the discharge capacity remains at or above 80% of the initial capacity reaches 2050.

From the results shown in Table 2, it can be seen that, compared with the Comparative Example in which the resistance layer is not provided, by arranging the resistance layer on the current collector, the projection of the part of the positive electrode active material layer on the current collector overlaps with the projection of the resistance layer on the current collector, and the projection of the other part of the positive electrode active material layer on the current collector does not overlap with the projection of the resistance layer on the current collector, cycle performance of the secondary batteries in Examples 7 to 21 could be significantly improved, the number of cycles in which the discharge capacity remained at or above 80% of the initial capacity was significantly increased from 835 to above 1500, which greatly prolongs the service life of the batteries while ensuring that the batteries maintain good power performance. The 60 s pulse discharge power of the batteries remained at or above 950 W.

In Examples 7 to 21, the film resistance value (R1) of the part of the positive electrode sheet where the resistance layer is provided was greater than the film resistance value (R2=0.35Ω) of the part where the resistance layer is not provided, thereby producing appropriate lithium ion polarization in the positive electrode sheet. Therefore, in the part of the positive electrode sheet where the resistance layer is provided, the deintercalation speed of active lithium ions is slowed down, so that part of lithium is retained in this part. During a subsequent cycle process of the battery, with gradual aging of the battery, the lithium ions retained in the region are gradually released, and battery capacity shows a trend of increasing first and then gradually fading, so that capacity fade of the battery is slowed down and service life of the battery is prolonged.

In addition, by adjusting the area ratio S of the resistance layer to the coating region of the current collector, the amount of lithium retained in the positive electrode active material layer above the resistance layer can be adjusted, so that the amount of active lithium retained in the positive electrode sheet is adjusted, and service life of the battery can be adjusted as required.

In addition, compared with Examples 20 and 21, in Examples 7 to 19, by adjusting the area ratio S of the resistance layer to the coating region of the current collector, the polarization parameter P of the positive electrode sheet could be adjusted to a range of 0.5 to 70.0, so that the additional technical effect of fully maintaining the power performance of the battery while further prolonging the battery life was achieved, the number of cycles in which the discharge capacity remained at or above 80% of the initial capacity was further increased to or above 1800, and the 60 s pulse discharge power of the battery remained at or above 1000 W.

In conclusion, by disposing the resistance layer on the current collector, appropriate lithium ion polarization can be produced in the positive electrode sheet. Compared with the Comparative Example in which the resistance layer is not provided on the current collector, cycle performance of the batteries in Examples 1 to 21 could be significantly improved, and the number of cycles in which the discharge capacity remained at or above 80% of the initial capacity could be or above 1500, thereby greatly prolonging cycle life of the battery. Moreover, it could also ensure that the battery maintains good power performance, and the 60 s pulse discharge power of the battery can remain at or above 950 W.

Example 22

The positive electrode sheet and the battery were prepared according to the general method described above. In Example 22, the composition of the resistance layer was the same as that in Example 3. In addition, the area ratio S of the resistance layer to the coating region of the current collector was 0.70. The thickness of the aluminum foil as the current collector was 12 μm. The thickness of the resistance layer disposed on the current collector was 10 μm. Dv50 of the positive electrode active material in the positive electrode active material layer was 4 μm. The thickness of the positive electrode sheet was 120 μm and the compacted density was 3.4 g/cm$^3$.

In addition, the projection of a part of the positive electrode active material layer on the current collector overlaps with a projection of the resistance layer on the current collector, and the projection of the other part of the positive electrode active material layer on the current collector does not overlap with the projection of the resistance layer on the current collector; moreover, the current collector is further provided with the conductive agent layer, and the projection of the conductive agent on the current collector does not overlap with the projection of the resistance layer on the current collector, as shown in FIG. 5.

In this example, the film resistance value R3 of the part of the positive electrode sheet where the conductive agent layer is provided was 0.25Ω. The film resistance value R1 of the part of the positive electrode sheet where the resistance layer is provided and the film resistance value R2 of the part where the resistance layer is not provided were 2.12Ω and 0.35Ω, respectively. The polarization parameter P was 8.48.

As measured by the performance test methods described above, in Example 22, since the conductive agent layer additionally provided, the problem of power capability reduction brought by the resistance layer to the battery is compensated, and cycle performance of the battery is greatly improved while the battery achieves excellent power performance. Compared with Examples 1 to 21 in which the conductive agent layer is not provided, the battery prepared in Example 22 had excellent cycle performance and power performance, and the number of cycles in which the discharge capacity remained at or above 80% of the initial capacity was further increased to 2680, the 60 s pulse discharge power was up to 1529.7 W, which is comparable to that in the Comparative Example in which the resistance layer is not provided.

Examples 23 to 26

The positive electrode sheets and the batteries were prepared in substantially the same way as in Example 7, except that the positive electrode sheets had different compacted densities and thus had different electrode sheet thicknesses, as shown in Table 3. Performance measurement results of the battery are also shown in Table 3.

TABLE 3

| | Compacted density of positive electrode sheet (g/cm$^3$) | Thickness of electrode sheet (μm) | Number of cycles | 60 s pulse discharge power (W) |
|---|---|---|---|---|
| Example 23 | 1.7 | 197 | 1803 | 1054.2 |
| Example 24 | 2.3 | 171 | 1856 | 1098.1 |
| Example 25 | 3.0 | 134 | 1905 | 1100.0 |
| Example 26 | 4.0 | 104 | 1878 | 1236.4 |

As shown in Table 3, compared with Example 23, when the compacted density was within a range of 2.0 to 4.0 g/cm$^3$, the following additional effects could also be achieved: the thickness of the electrode sheet was reduced, the energy density of the battery was increased, the active lithium shuttle path was shortened, so that the battery power performance was further improved while the battery cycle life was prolonged, the number of cycles in which the discharge capacity remained at or above 80% of the initial capacity was up to or above 1850, and the 60 s pulse discharge power remained at or above 1050 W.

Examples 27 to 37

The positive electrode sheets and the batteries were prepared according to the general method described above. In the resistance layer, based on the total weight of the resistance layer, the mass content of the conductive agent was 2%, and the mass content of the binder was 98%. The thickness of the aluminum foil as the current collector was 12 μm. The thickness of the resistance layer disposed on the current collector was 10 μm. The thickness of the positive electrode sheet was 120 μm and the compacted density was 3.4 g/cm$^3$.

In Examples 27 to 37, the film resistance value R1 of the part where the resistance layer is provided and the film resistance value R2 of the part where the resistance layer is not provided were 5.81Ω and 0.35Ω, respectively. In addition, the area ratio S of the resistance layer to the coating region of the current collector was 0.55. Correspondingly, the value of polarization parameter P was 13.6.

In addition, the projection of a part of the positive electrode active material layer on the current collector overlaps with the projection of the resistance layer on the current collector, and the projection of the other part of the positive electrode active material layer on the current collector does not overlap with the projection of the resistance layer on the current collector, as shown in FIG. 4.

Dv50 of the positive electrode active material in the positive electrode active material layer and performance measurement results of the battery are shown in Table 4.

TABLE 4

| | Positive electrode active material Dv50 (μm) | Number of cycles | 60 s pulse discharge power (W) |
|---|---|---|---|
| Example 27 | 3 | 2048 | 1169.0 |
| Example 28 | 4 | 2179 | 1243.7 |
| Example 29 | 6 | 2280 | 1301.4 |
| Example 30 | 8 | 2402 | 1371.0 |
| Example 31 | 11 | 2555 | 1458.3 |
| Example 32 | 14 | 2628 | 1500.0 |
| Example 33 | 16 | 2578 | 1471.5 |
| Example 34 | 17 | 2423 | 1383.0 |
| Example 35 | 18 | 2396 | 1367.6 |
| Example 36 | 19 | 2308 | 1317.4 |
| Example 37 | 20 | 2188 | 1248.9 |

The results shown in Table 4 show that in the positive electrode sheet of the present application, by increasing the particle size of the positive electrode active material, polarization can be generated inside particles of the positive electrode active material, which further improves polarization capability of the positive electrode sheet, thereby additionally improving cycle performance of the battery. Compared with Examples 33 to 37, in Examples 27 to 32, Dv50 of the positive electrode active material was in a range of 3 to 15 μm, and particles were more fully dispersed. As the particle size of the positive electrode active material increases, the cycle life and power performance of the battery both have a trend of increasing.

In conclusion, by adjusting the composition of the resistance layer provided on the current collector of the positive electrode sheet, the film resistance value of the part of the positive electrode sheet where the resistance layer is provided is adjusted, so that on the cross section of the positive electrode sheet, the projection of the part of the positive electrode active material layer on the current collector overlaps with the projection of the resistance layer on the current collector, and the projection of the other part of the positive electrode active material layer on the current collector does not overlap with the projection of the resistance layer on the current collector, which can bring the positive electrode sheet a certain polarization capability, and then slow down capacity fade of the battery; and moreover, the number of cycles in which the discharge capacity remained at or above 80% of the initial capacity was up to or above 1500, thereby greatly prolonging service life of the battery while ensuring good power performance of the battery, where the 60 s pulse discharge power of the battery remained at or above 950 W.

INDUSTRIAL APPLICABILITY

According to the present application, the positive electrode sheet provided with a resistance layer on the current collector has an effect of enhancing lithium ion polarization of the electrode sheet when being applied to a secondary battery. During a cycle process, with the gradual aging and elimination of the battery polarization, the battery capacity shows a trend of increasing first and then gradually fading, so that cycle life of the battery is prolonged while ensuring power performance of the battery. Thus, the present application is suitable for industrial applications.

The invention claimed is:

1. A positive electrode sheet for a secondary battery, comprising:
- a current collector comprising a coating region and a non-coating region other than the coating region;
- a resistance layer disposed on the current collector and comprising a conductive agent and a first binder, but not comprising a positive electrode active material;
- a positive electrode active material layer comprising the positive electrode active material, a conductive agent, and a second binder; and
- a conductive agent layer sandwiched between the positive electrode active material layer and the current collector;

wherein:
- a resistance of the resistance layer is greater than a resistance of the positive electrode active material layer, and a resistance of the conductive agent layer is less than the resistance of the positive electrode active material layer; and
- in a cross section of the positive electrode sheet:
  - a projection of a part of the positive electrode active material layer on the current collector overlaps with a projection of the resistance layer on the current collector;
  - a projection of another part of the positive electrode active material layer on the current collector does not overlap with the projection of the resistance layer on the current collector; and
  - a projection of the conductive agent layer on the current collector is within the current collector and does not overlap with the projection of the resistance layer on the current collector.

2. The positive electrode sheet according to claim 1, wherein a polarization parameter $P=((1-S)/S)\cdot(R1/R2)$ of the positive electrode sheet is in a range of 0.5 to 70.0, where S is an area ratio of the resistance layer to the coating region of the current collector, R1 is a film resistance value of a part of the positive electrode sheet where the resistance layer is provided, and R2 is a film resistance value of a part of the positive electrode sheet in the coating region where the resistance layer is not provided.

3. The positive electrode sheet according to claim 1, wherein an area ratio of the resistance layer to the coating region of the current collector is in a range of 0.20 to 0.80.

4. The positive electrode sheet according to claim 1, wherein a projection of the positive electrode active material layer on the current collector fully covers the projection of the resistance layer on the current collector.

5. The positive electrode sheet according to claim 1, wherein a mass ratio of the first binder to the conductive agent in the resistance layer is greater than a mass ratio of the second binder to the conductive agent in the positive electrode active material layer.

6. The positive electrode sheet according to claim 5, wherein:
- in the resistance layer, the mass ratio of the first binder to the conductive agent is in a range of 2.2 to 50.0; and/or
- in the positive electrode active material layer, the mass ratio of the second binder to the conductive agent is in a range of 1.6 to 10.0.

7. The positive electrode sheet according to claim 1, wherein in the resistance layer, a mass content of the conductive agent is 2.0 to 30.0 wt % of a total weight of the resistance layer, and a mass content of the first binder is 70.0 to 98.0 wt % of the total weight of the resistance layer.

8. The positive electrode sheet according to claim 1, wherein:
- the projection of the conductive agent layer and the projection of the resistance layer on the current collector fully cover the projection of the positive electrode active material layer on the current collector.

9. The positive electrode sheet according to claim 1, wherein a ratio of the film resistance value R1 of the part of the positive electrode sheet where the resistance layer is provided to a film resistance value R2 of a part of the positive electrode sheet in the coating region where the resistance layer is not provided is in a range of 1.15 to 26.00.

10. The positive electrode sheet according to claim 9, wherein:
- R1 is in a range of 0.3 to 9.0Ω; and/or
- R2 is in a range of 0.3 to 4.0Ω.

11. The positive electrode sheet according to claim 1, wherein:
- the positive electrode active material comprises one or more selected from lithium cobalt oxide, lithium manganate, lithium nickel cobalt manganese oxide, lithium nickel cobalt aluminium oxide, lithium iron phosphate, and lithium manganese nickel oxide;
- the conductive agent comprises one or more selected from graphite, carbon black, acetylene black, graphene, and carbon nanotubes; and
- each of the first binder and the second binder comprises one or more selected from polyvinylidene fluoride, polyacrylic acid, polytetrafluoroethylene, and polyimide.

12. The positive electrode sheet according to claim 1, wherein:
- the positive electrode active material comprises one or more selected from layered transition metal oxide, polyanionic compound, Prussian blue compound, sulfide, nitride, carbide, and titanate;

the conductive agent comprises one or more selected from graphite, carbon black, acetylene black, graphene, and carbon nanotubes; and each of the first binder and the second binder comprises one or more selected from polyvinylidene fluoride, polyacrylic acid, polytetrafluoroethylene, and polyimide.

13. The positive electrode sheet according to claim 1, wherein a compacted density of the positive electrode sheet is 1.5 to 4.0 g/cm$^3$.

14. The positive electrode sheet according to claim 1, wherein:

a thickness of the current collector is 8 to 14 μm;

a thickness of the positive electrode sheet is 100 to 200 μm;

a thickness of the resistance layer is 1 to 30 μm; and/or $D_v50$ of the positive electrode active material is 1 to 20 μm.

15. A secondary battery, comprising:

a positive electrode, the positive electrode comprising the positive electrode sheet of claim 1.

16. An electrical apparatus, comprising the secondary battery according to claim 15.

17. A battery module, comprising:

the secondary battery according to claim 15.

18. A battery pack, comprising the battery module according to claim 17.

* * * * *